United States Patent [19]

Offidani

[11] Patent Number: 4,557,984
[45] Date of Patent: Dec. 10, 1985

[54] ADAPTER GUIDE FOR AIR SUPPLY TUBE

[75] Inventor: Ralph V. Offidani, Willingboro, N.J.

[73] Assignee: GNB Batteries Inc., Mendota Heights, Minn.

[21] Appl. No.: 688,091

[22] Filed: Dec. 31, 1984

[51] Int. Cl.[4] .......................................... H01M 2/38
[52] U.S. Cl. ........................................ 429/67; 429/71; 429/81
[58] Field of Search ...................... 429/67, 81, 71, 72, 429/91

[56] References Cited

U.S. PATENT DOCUMENTS

| | | | |
|---|---|---|---|
| 1,632,364 | 6/1927 | Carpenter | 429/82 |
| 1,869,258 | 7/1932 | Holland | 429/82 |
| 2,141,621 | 12/1938 | Setzer | 429/77 |
| 3,040,116 | 6/1962 | Gauvin | 114/211 |
| 3,301,713 | 1/1967 | Lozeau | 429/82 |
| 3,944,437 | 3/1976 | Auerbach | 429/82 |
| 4,053,683 | 10/1977 | Rounds | 429/67 |
| 4,283,467 | 8/1981 | Gutlich et al. | 429/81 |

FOREIGN PATENT DOCUMENTS 2004409  3/1979  United Kingdom ................. 429/67

Primary Examiner—Donald L. Walton
Attorney, Agent, or Firm—Augustus J. Hipp; Charles L. Rowe

[57] ABSTRACT

An improved battery structure permitting facilitated replacement of an air supply tube through an air lift pump. The air lift pump includes, as guide means, a funnel portion receiving the inserted distal end of the replacement air supply tube for automatically guiding the distal end downwardly therethrough and into the passage of a depending barrel in which percolation of the electrolyte of the battery is effected by the bubbling of air downwardly through the air supply tube into the barrel. The upper end of the barrel is provided with an outlet tube extending downwardly into the electrolyte, thereby avoiding splashing of the electrolyte, such as against the flash arrester vent of the battery, thereby reducing maintenance and permitting long, troublefree life of the battery. The air supply tube and outlet tube may be formed of a transparent synthetic resin, permitting observation of the air flow during operation.

20 Claims, 5 Drawing Figures

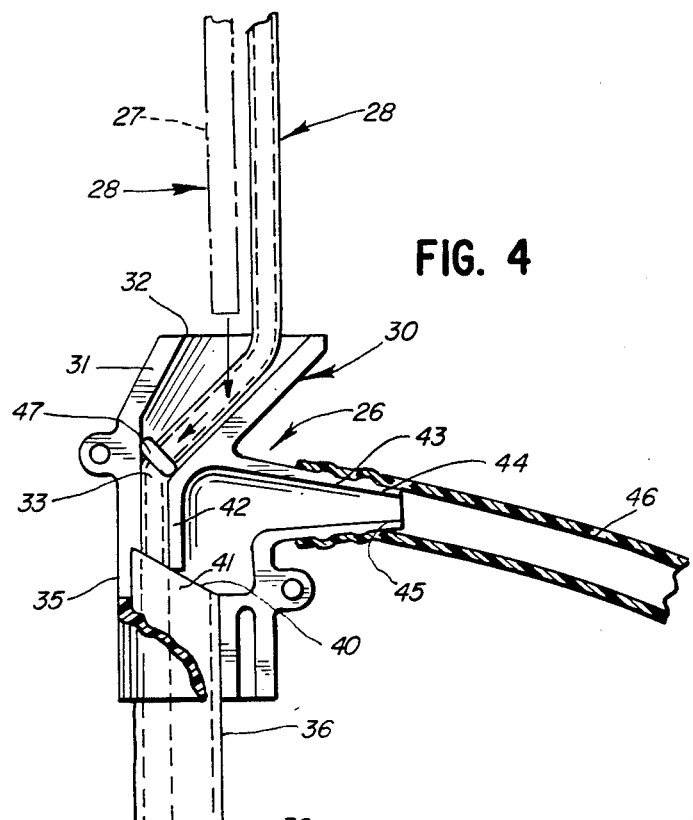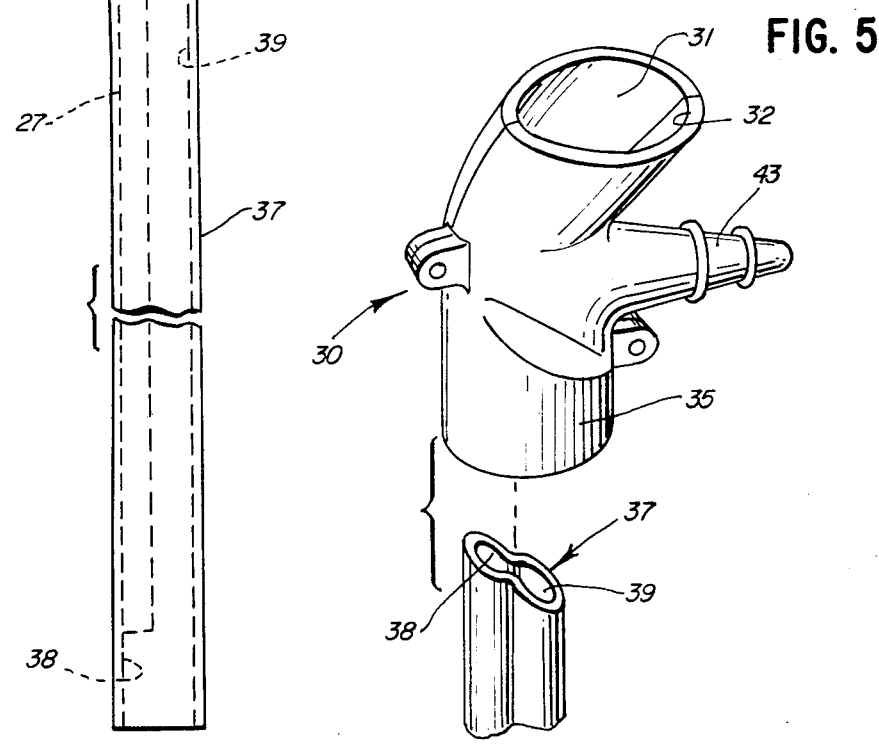

ADAPTER GUIDE FOR AIR SUPPLY TUBE

TECHNICAL FIELD

This invention relates to batteries and in particular to batteries utilizing air agitation in the operation thereof.

BACKGROUND ART

In one common form of battery comprising a calcium cell, air agitation of the electrolyte is required. It is conventional to provide means for continuously pumping air through the electrolyte to prevent stratification thereof. It is conventional to provide a relatively low rate, such as 0.03 CFM of air delivery through a supply tube from the ambient atmosphere.

A problem arises in the need for periodically replacing the air supply tube which extends outwardly through a coupling nut for conducting the desired air to a supply barrel of an airlift pump within the battery. In one conventional prior art battery utilizing such an air supply means, as illustrated in FIG. 3 of the drawing, the battery generally designated 10 is provided with a flash arrester generally designated 11 removably carried on the cover 12 closing the upper open end of the case, or jar, 13 of the battery. The coupling nut 14 is then removed. The removal of the flash arrester assembly permits the insertion of the serviceman's hand through the resulting opening, permitting the hand to be used to guide a replacement air supply tube 15 being fed through the opening resulting from the removal of the coupling nut 14. The user must guide the tube 15 into a small opening 16 in the airlift pump generally designated 17, which is not only difficult, but also hazardous because of the presence of the electrolyte and the current producing capabilities of the cell.

A battery charging system for use in submarines and the like is disclosed in U.S. Pat. No. 3,040,116 as having an air supply tube extending downwardly through a cap into a percolator tube. Air passing downwardly through the supply tube bubbles upwardly through the electrolyte in the percolator tube, thereby causing circulation and agitation of the electrolyte. The continuous internal agitation and recirculation of the electrolyte in the battery is intended to enable a fast charging of the battery with a rapid release of hydrogen gas therefrom to be burned by the submarine engine. As specifically disclosed by Gauvin, the agitation and recirculation of the electrolyte overcomes any stratification of the electrolyte where the more dense, or higher specific gravity electrolyte formed during charging tends to accumulate at the bottom of the cell. The percolator tube is provided with a top member which has a small opening through which the air supply tube must be inserted and, thus, Gauvin illustrates the problem in the prior art of the air tube replacement discussed above.

DISCLOSURE OF INVENTION

The present invention comprehends an improved battery structure wherein means are provided for facilitating replacement of the air supply tube in a novel and simple manner.

More specifically, the invention comprehends the provision in such a battery structure of means for guiding the air supply tube automatically into desired association with the air lift pump barrel assembly without the need for the user inserting his hand into the battery cell.

In the illustrated embodiment, the air lift pump barrel assembly includes an upper inlet portion which widens upwardly so as to define means for automatically guiding the distal of the air supply tube during the insertion thereof into the pump barrel assembly.

The invention further comprehends the provision of means for effectively seating the air supply tube at the inner end of the inlet portion of the barrel assembly so as to prevent splashing upwardly as a result of the agitation of the electrolyte.

Further more specifically, the invention comprehends the provision of means on the pump barrel assembly for connecting an air outlet tube thereto for effectively preventing electrolyte splashing as a result of the percolation agitation of the electrolyte in the air lift pump barrel assembly.

In the illustrated embodiment, the air outlet tube extends substantially downwardly from the upper end of the pump barrel assembly so as to terminate in or adjacent the level of electrolyte in the cell for effectively eliminating undesirable electrolyte splashing and wetting of the flash arrester vent.

As a result of the improved structure discussed above, the maintenance requirements of the battery are substantially reduced, thereby providing longer troublefree life of the battery, while, at the same time, permitting facilitated replacement of the air supply tube when necessary.

More specifically, the invention comprehends providing in a battery having a liquid electrolyte and plates immersed in the electrolyte within an outer case, an air lift pump within the case having, as guide means, a funnel defining a tapered inlet portion having an outer end and an inner smaller cross section portion, an opening in the case aligned with the inlet outer end, an air supply tube extending through the case opening and outer end of the inlet portion and having an inner portion removably received in the funnel inner portion thereof as an incident of the tube inner end being inserted through the case opening and inlet outer end, the tapered inlet configuration defining means for effectively guiding the distal inner end of the tube accurately into the smaller inner portion of the funnel as an incident of insertion thereof through the case opening into the funnel.

The air lift pump further defines an air outlet having an elongated tube connected thereto.

In the illustrated embodiment, the opening in the case opens in a first direction toward the outer end of the inlet portion of the barrel and the barrel tapers inwardly from the outer end angularly to the first direction.

The inlet portion, in the illustrated embodiment, is frustoconical.

The barrel inner portion comprises passage means extending substantially parallel to the first direction inwardly from the inlet portion receiving the distal end of the air supply tube.

In the illustrated embodiment, the air supply tube is provided with stop means for limiting the insertion of the air supply tube into the barrel.

In the illustrated embodiment, the stop means is formed integrally as an annular boss on the air supply tube spaced from the distal end thereof.

In the illustrated embodiment, the stop is seated with the barrel in the smaller end portion of the inlet.

The improved structure of the present invention facilitates replacement of the air supply tube, effectively eliminates electrolyte splashing to avoid damage to the flash arrester vent, and permits facilitated checking of the flow rate of the air by providing the air supply tube as a transparent synthetic resin element.

BRIEF DESCRIPTION OF THE DRAWING

Other features and advantages of the invention will be apparent from the following description taken in connection with the accompanying drawing wherein:

FIG. 4 is a fragmentary enlarged elevation of the air supply means of the invention, with portions shown in section to facilitate illustration thereof; and FIG. 5 is a fragmentary perspective view of the air lift pump barrel and associated passage means for receiving the inserted air supply tube end.

BEST MODE FOR CARRYING OUT THE INVENTION

Figure 1:
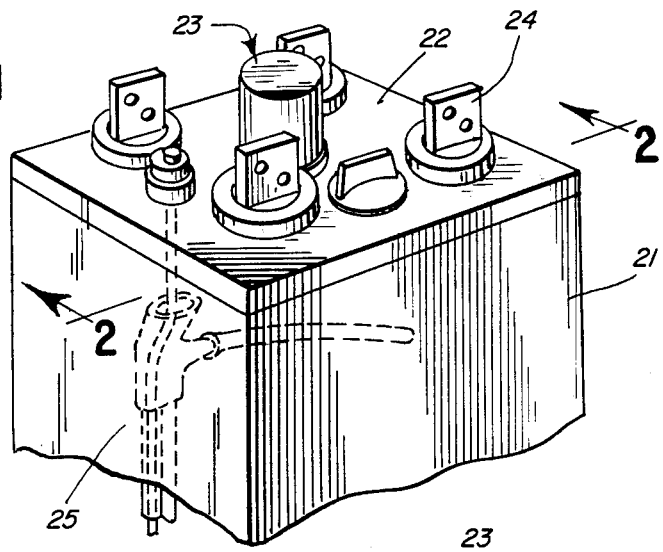
FIG. 1 is a fragmentary perspective view of a battery structure embodying the invention.

In the illustrative embodiment of the invention as disclosed in FIGS. 1, 2, 4 and 5 of the drawing, a battery generally designated 20 is provided with a case, or jar, 21, having an overlying cover 22.

Mounted to the cover is a flash arrester assembly 23 and a plurality of upstanding terminals 24.

An air supply generally designated 25 is provided for introducing ambient air into the battery for effecting agitation of the electrolyte 48 therein so as to effectively prevent stratification. Thus, the battery 20 may illustratively comprise a calcium cell requiring such agitation.

Air supply 25 includes an air lift pump barrel assembly 26, which is arranged to receive the lower end 27 of an air supply tube 28 extending downwardly into the case 13 through a coupling nut 29 carried by the cover 22.

Figure 2:
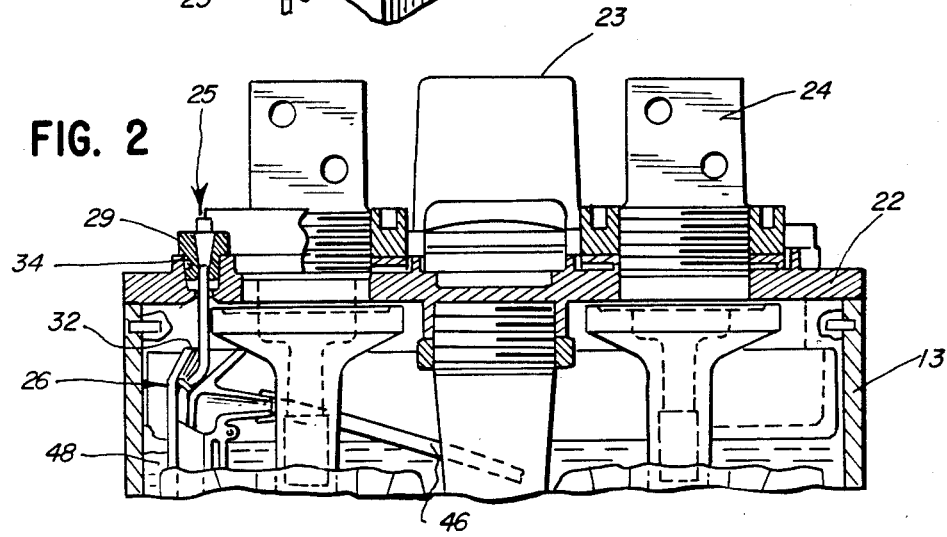
FIG. 2 is a fragmentary enlarged vertical section thereof.
Figure 3:
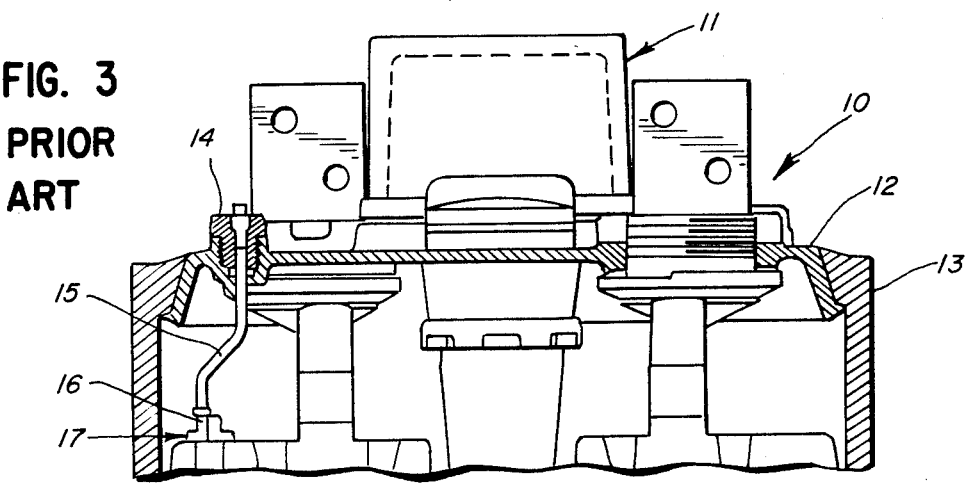
FIG. 3 is a fragmentary vertical section illustrating the prior art construction.

As best seen in FIGS. 4 and 5, the air lift pump barrel assembly 26 includes, as guide means, a funnel 30 having a tapered inlet portion 31 defining an outer, large end 32 and an inner, narrow end 33. As shown in FIG. 2, the coupling nut 29 is received in an opening 34 in cover 22, which is aligned with the enlarged outer end 32 of the funnel. As shown in broken lines in FIG. 4, the tube 28 is inserted downwardly into the enlarged upper end 32 of the funnel and is guided by the funnel angularly downwardly to the lower end 33.

The funnel further includes a lower portion 35 extending downwardly from the inner end 33 of the inlet portion 31 and receiving the upper end 36 of a pump barrel 37.

As seen in FIG. 5, the pump barrel defines a tubular element having a generally figure-eight cross section defining a first passage 38 downwardly through which the lower end 27 of the air supply tube 28 extends, and a second upwardly opening passage 39.

As shown in FIG. 4, the distal upper end 40 of the barrel upper end portion 36 is beveled and the center portion 41 thereof rests against a depending center wall 42 of the funnel. The funnel further defines a turned outlet portion 43 which opens downwardly into communication with the upper end of the passage 39. The outer distal end 44 of the turned portion 43 defines a tapered tube connector for receiving an end 45 of an outlet tube 46, which, as seen in FIG. 2, extends downwardly from the connector end 44 into the electrolyte 48 within the case 13.

As further illustrated in FIG. 4, air supply tube 28 is provided with an integral annular boss 47 spaced upwardly from the lower end 27 of the air supply tube, which seats in the inner end of the funnel when the air supply tube is fully inserted through the funnel to the arrangement of FIG. 4. The lower end 27 of the air supply tube is guided by the angularly inclined funnel configuration to direct the lower end 27 of the air supply tube downwardly into the lower end 35 of the funnel and thence downwardly into the passage 38 of the barrel 37.

Stop 47 not only serves to provide a positive indication of the full insertion of the tube into the device, but also tends to seat the tube at the narrow portion 33 so as to more effectively cause the air lift to function through the outlet tube 46. More specifically, as air bubbles are delivered downwardly through the air tube, they percolate upwardly through the electrolytic fluid in the passage 39, lifting the fluid and circulating it outwardly through the outlet tube 46 so as to provide desired agitation of the electrolyte during use of the battery. The provision of the outlet tube 46 effectively eliminates electrolytic splashing, thereby preventing wetting of the flash arrester and effectively reducing maintenance requirements in the battery structure.

In the illustrated embodiment, the outlet tube 46 is formed of a transparent material, such as "Tygon" brand synthetic resin and, thus, the flow rate of the air bubbles may be observed through the jar wall so as to provide checking of the functioning of the air lift.

In the illustrated embodiment, the air supply tube is formed of a suitable synthetic resin, such as polyethylene, the funnel is formed of a suitable synthetic resin, such as Monsanto "Lustrex" brand polystyrene resin, and the pump barrel may be formed of a suitable synthetic resin, such as Monsanto "Lustran" brand ABS synthetic resin. In the illustrated embodiment, the air flow is approximately 0.03 CFM through the air lift system.

As indicated above, the novel air lift structure permits facilitated replacement of the air supply tube 28. Thus, to replace the air supply tube, the user merely removes the coupling nut 29 and withdraws the old tube through the opening 34. A new air supply tube is then inserted with the lower end 27 being guided downwardly through the funnel which, as indicated above, is aligned subjacent the opening 34, thereby effectively eliminating any need for accurate fitting of the tube into the air lift pump. The lower end continues downwardly through the lower end of the funnel portion into the barrel passage 38 to the final position of FIG. 4, wherein the stop 47 seats in the lower end of the funnel, providing an automatic indication of the full insertion of the air supply tube and arranging the system for the automatic percolation of the electrolyte upwardly through the passage 39 and outwardly through the outlet tube 46, as discussed above. During the insertion of the air supply tube, the tube may be concurrently rotated during the insertion for further facilitated introduction of the distal end thereof through the funnel into the passage 38. There is no need for the user to insert any portion of his hands into the battery and, thus, the replacement is not only facilitated, but substantially without danger to the serviceman.

The foregoing disclosure of specific embodiments is illustrative of the broad inventive concepts comprehended by the invention.

I claim:

1. In a battery having a liquid electrolyte and plates immersed in the electrolyte within an outer case, the improvement comprising:

an air lift pump barrel assembly within the case having guide means defining a tapered inlet portion having an outer end and an inner smaller cross section portion;

means in said case defining an opening aligned with said inlet outer end; and an air supply tube extending through said case opening and outer end of the inlet portion and having an inner portion removably received in said guide means inner portion thereof as an incident of said tube inner end being inserted through said case opening and inlet outer end, said tapered inlet configuration defining means for effectively guiding the distal inner end of the tube accurately into said smaller inner portion of the guide means as an incident of insertion thereof through said case opening into said guide means.

2. The storage battery structure of claim 1 wherein said air lift pump barrel assembly further defines an air outlet having an elongated tube connected thereto.

3. The storage battery structure of claim 1 wherein said opening in the case opens in a first direction toward said inlet portion outer end and said barrel tapers inwardly from said outer end angularly to said first direction.

4. The storage battery structure of claim 1 wherein said inlet portion is frustoconical.

5. The storage battery structure of claim 1 wherein said inlet portion is frustoconical and said guide means inner portion comprises passage means extending substantially parallel to said first direction inwardly from said inlet portion and receiving the distal end of the air supply tube.

6. The storage battery structure of claim 1 wherein said air supply tube is provided with stop means for limiting the insertion of the air supply tube into said guide means.

7. The storage battery structure of claim 1 wherein said air supply tube is provided with integral stop means for limiting the insertion of the air supply tube into said guide means.

8. The storage battery structure of claim 1 wherein said air supply tube is provided with integral stop means for limiting the insertion of the air supply tube into said guide means comprising an annular boss on the air supply tube spaced from the distal end thereof.

9. The storage battery structure of claim 1 wherein said air supply tube is provided with integral stop means for limiting the insertion of the air supply tube into said guide means, said air supply tube being provided with integral stop means for limiting the insertion of the air supply tube into said guide means comprising an annular boss on the air supply tube spaced from the distal end thereof.

10. The storage battery structure of claim 1 wherein said guide means comprises a funnel member.

11. In a battery having a liquid electrolyte and plates immersed in the electrolyte within an outer case, the improvement comprising:

an air lift pump barrel assembly within the case having a funnel defining a tapered inlet portion having an outer end and an inner smaller cross section portion;

means in said case defining an opening aligned with said inlet outer end; and an air supply tube extending through said case opening and outer end of the inlet portion and having an inner portion removably defining a stop portion seated in said funnel inner portion thereof as an incident of said tube inner end being inserted through said case opening and inlet outer end, said tapered inlet configuration defining means for effectively guiding the distal inner end of the tube accurately into seated engagement with said smaller inner portion of the funnel as an incident of insertion thereof through said case opening into said funnel.

12. The storage battery structure of claim 11 wherein said stop portion of the air supply tube comprises a radially enlarged portion.

13. The storage battery structure of claim 11 wherein said stop portion of the air supply tube comprises an annular radially enlarged portion.

14. The storage battery structure of claim 11 wherein said air lift pump barrel assembly further defines an air outlet having an elongated tube connected thereto.

15. The storage battery structure of claim 11 wherein said opening in the case opens in a first direction toward said inlet portion outer end and said barrel tapers inwardly from said outer end angularly to said first direction.

16. The storage battery structure of claim 11 wherein said inlet portion is frustoconical.

17. The storage battery structure of claim 11 wherein said inlet portion is frustoconical and said funnel inner portion comprises passage means substantially parallel to said first direction inwardly from said inlet portion and receiving the distal end of the air supply tube.

18. The storage battery structure of claim 11 wherein said inlet portion is frustoconical and said funnel inner portion comprises passage means substantially parallel to said first direction inwardly from said inlet portion and receiving the distal end of the air supply tube, and said funnel further defines means for connecting an air outlet tube thereto in communication with said passage means.

19. The storage battery structure of claim 11 wherein said inlet portion is frustoconical and said funnel inner portion comprises passage means substantially parallel to said first direction inwardly from said inlet portion and receiving the distal end of the air supply tube, and said funnel further defines means for connecting an air outlet tube thereto in communication with said passage means, said storage battery structure further including an air outlet tube connected to said connecting means and terminating within the electrolyte.

20. The storage battery structure of claim 11 wherein said inlet portion is frustoconical and said funnel inner portion comprises passage means substantially parallel to said first direction inwardly from said inlet portion and receiving the distal end of the air supply tube, and said funnel further defines means for connecting an air outlet tube thereto in communication with said passage means, said storage battery structure further including a transparent air outlet tube connected to said connecting means and terminating within the electrolyte.

* * * * *